(12) United States Patent
Southard et al.

(10) Patent No.: US 12,726,124 B2
(45) Date of Patent: Sep. 1, 2026

(54) MULTI-PHASE BUCK-BOOST CONVERTER

(71) Applicant: TEXAS INSTRUMENTS INCORPORATED, Dallas, TX (US)

(72) Inventors: Eric Southard, Richardson, TX (US); Daniel A. Mavencamp, Dallas, TX (US); Qiong Li, Allen, TX (US); Shishuo Zhao, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 109 days.

(21) Appl. No.: 17/957,789

(22) Filed: Sep. 30, 2022

(65) Prior Publication Data

US 2024/0113624 A1 Apr. 4, 2024

(51) Int. Cl.
*H02M 3/158* (2006.01)
*H02M 1/00* (2006.01)
*H02M 1/08* (2006.01)

(52) U.S. Cl.
CPC ....... *H02M 3/1582* (2013.01); *H02M 1/0009* (2021.05); *H02M 1/08* (2013.01); *H02J 2207/20* (2020.01)

(58) Field of Classification Search
CPC .... H02M 3/1582; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381;
(Continued)

(56) References Cited

U.S. PATENT DOCUMENTS 10,749,474 B2 * 8/2020 Botti .................... H03F 1/0205
10,879,839 B2 * 12/2020 Ayyanar ................. H02S 40/32
(Continued)

FOREIGN PATENT DOCUMENTS

| CN | 114362518 A | 4/2022 |
|---|---|---|
| WO | 2009023380 A1 | 2/2009 |
| WO | 2022001966 A1 | 1/2022 |

OTHER PUBLICATIONS

International Search Report mailed Jan. 30, 2024.
(Continued)

*Primary Examiner* — Jeffrey A Gblende
(74) *Attorney, Agent, or Firm* — Charles F. Koch

(57) ABSTRACT

A multi-phase buck-boost converter includes a first half-bridge circuit, a second half-bridge circuit, a third half-bridge circuit, and a control circuit. The first half-bridge circuit is coupled to a first inductor terminal. The second half-bridge circuit is coupled to a second inductor terminal. The third half-bridge circuit is coupled to a third inductor terminal, a system voltage terminal, and a battery terminal. The control circuit is coupled to the first half-bridge circuit, the second half-bridge circuit, and the third half-bridge circuit. The control circuit is configured to transition the first half-bridge circuit, the second half-bridge circuit, and the third half-bridge circuit from operation in a buck mode to operation in a buck-boost mode based on an off-time of the first half-bridge being less than a particular time.

26 Claims, 10 Drawing Sheets

(58) Field of Classification Search
CPC ................. H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02M 1/0043; H02J 3/46; H02J 3/38
See application file for complete search history.

(56) References Cited

U.S. PATENT DOCUMENTS 10,998,820 B2 * 5/2021 Dilley ................. H02M 3/1584
2010/0019745 A1 1/2010 Keskar
2017/0187213 A1 6/2017 Xu
2017/0187214 A1 6/2017 Xu
2020/0373841 A1 * 11/2020 Xie ..................... H02M 3/1582
2022/0102996 A1 * 3/2022 Sporck ................ H02M 3/1586
2024/0030856 A1 * 1/2024 Smolenaers ............ B60L 50/60

OTHER PUBLICATIONS

Szolusha, Keith. "LT3791-1 360W and 240W 24V Voltage Regulators Using Parallel 60V 4-Switch Buck-Boost Controller." Linear Technology. Nov. 2012. pp. 1-9.
Texas Instruments. "TPS40322 Dual Output or Two-Phase Synchronous Buck Controller." SLUSAF8E—Jul. 2011—Revised Jan. 2016. pp. 1-48.
Monolithicpower.com, 12C-Controlled 6A Buck or Boost Charger with NVDC Power Management and USB OTG for 2 Cells in Series Battery Applications, MP2762A Rev. 1.1, Jul. 14, 2023, 61 pages.

* cited by examiner

INDUCTOR CURRENT A
INDUCTOR CURRENT B
146
148
Q1A DRIVE VOLTAGE
134
Q1B DRIVE VOLTAGE
144
Q2A DRIVE VOLTAGE
136
Q2B DRIVE VOLTAGE
142
Q3 DRIVE VOLTAGE
138
Q4 DRIVE VOLTAGE
140

MULTI-PHASE BUCK-BOOST CONVERTER

BACKGROUND

Rechargeable batteries, e.g. lithium-ion batteries, are widely used to power portable electronic devices. Examples of portable electronic devices employing rechargeable batteries include smartphones, laptop computers, tablet computers, power tools, and the like. Rechargeable batteries typically require some form of battery charging system. Battery charging systems transfer power from a power source, such as an AC wall plug, into the battery. The recharging process typically includes processing and conditioning voltages and currents from the power source so that the voltages and currents supplied to the battery meet the particular battery's charging specifications. For example, if the voltages or currents supplied to the battery are too large, the battery can be damaged or even explode. On the other hand, if the voltages or currents supplied to the battery are too small, the charging process can take an undesirably long time. Battery charging systems may include a DC-DC converter to generate a suitable charging voltage.

SUMMARY

In one example, a multi-phase buck-boost converter includes a first half-bridge circuit, a second half-bridge circuit, a third half-bridge circuit, and a control circuit. The first half-bridge circuit is coupled to a first inductor terminal. The second half-bridge circuit is coupled to a second inductor terminal. The third half-bridge circuit is coupled to a third inductor terminal and a system voltage terminal. The control circuit is coupled to the first half-bridge circuit, the second half-bridge circuit, and the third half-bridge circuit. The control circuit is configured to transition the first half-bridge circuit, the second half-bridge circuit, and the third half-bridge circuit from operation in a buck mode to operation in a buck-boost mode based on an off-time of the first half-bridge circuit being less than a particular time.

In another example, a multi-phase buck-boost converter includes an input voltage terminal, an output voltage terminal, a first inductor terminal, a second inductor terminal, a third inductor terminal, a first half-bridge circuit, a second half-bridge circuit, a third half-bridge circuit, and a control circuit. The first half-bridge circuit is coupled to the input voltage terminal and the first inductor terminal. The second half-bridge circuit is coupled to the input voltage terminal and the second inductor terminal. The third half-bridge circuit is coupled to the output voltage terminal and the third inductor terminal. The control circuit is coupled to the first half-bridge circuit, the second half-bridge circuit, and the third half-bridge circuit. The control circuit configured to operate the first half-bridge circuit, the second half-bridge circuit, and the third half-bridge circuit as a buck converter based on an on-time of the first half-bridge circuit being less than a first particular time. The control circuit is also configured to operate the first half-bridge circuit, the second half-bridge circuit, and the third half-bridge circuit as a buck-boost converter based on an off-time of the first half-bridge being less than a second particular time. The control circuit is further configured to operate the first half-bridge circuit, the second half-bridge circuit, and the third half-bridge circuit as a boost converter based on an off-time of the first half-bridge circuit being less than a third particular time.

In a further example, a computer system includes a processor, a battery, and a battery charger circuit. The battery is coupled to the processor, and is configured to power the processor. The battery charger circuit is coupled to the battery, and includes a multi-phase buck-boost converter. The multi-phase buck-boost converter includes a first half-bridge circuit, a second half-bridge circuit, a third half-bridge circuit, and a control circuit. The first half-bridge circuit is coupled to a first inductor terminal. The second half-bridge circuit is coupled to a second inductor terminal. The third half-bridge circuit is coupled to a third inductor terminal, a system voltage terminal, and a battery terminal. The control circuit is coupled to the first half-bridge circuit, the second half-bridge circuit, and the third half-bridge circuit. The control circuit is configured to transition the first half-bridge circuit, the second half-bridge circuit, and the third half-bridge circuit from operation in a buck mode to operation in a buck-boost mode based on an off-time of the first half-bridge circuit being less than a first particular time. The control circuit is also configured to transition the first half-bridge circuit, the second half-bridge circuit, and the third half-bridge circuit from operation in the buck-boost mode to operation in a boost mode based on an off-time of the first half-bridge circuit being less than a second particular time.

DETAILED DESCRIPTION

In many battery powered devices, the voltage received to charge the battery may be higher or lower than the battery voltage. To accommodate such a range of charging voltages, the battery charger may include a buck-boost DC-DC converter that steps the charging voltage up or down. To increase power output, and decrease circuit volume, some battery charger circuits include multi-phase DC-DC converters (e.g., dual-phase DC-DC converters). Multi-phase DC-DC converters include multiple inductors, and current per inductor is reduced relative to a single-phase DC-DC converter. Multi-phase conversion is usually applied in buck conversion, where higher power is delivered.

Some dual-phase buck-boost DC-DC converters use eight transistor switches, which increases circuit area, routing difficulty, and cost. Implementations using six transistor switches have not provided true buck-boost operation, and operate properly only if the charging voltage is outside a specified voltage range (a dead zone) about the battery voltage (greater than or less than battery voltage by a specified amount). The utility of such implementations is limited. Additionally, in six transistor implementations, the input and output ripple current may be increased when operating in boost mode, due to the reduction in effective inductance caused by paralleling the inductors of the multiple phases.

The battery charger circuit described herein includes a multi-phase buck-boost DC-DC converter implemented with six transistor switches. Examples of the DC-DC converter operate over a wide range of input voltages with no dead zones, and reduce circuit area and cost relative to eight transistor implementations. In the buck-boost mode, switching is sequenced to equalize inductor currents between the phases. More specifically, when one inductor is de-integrated, the other inductor is also de-integrated before allowing boost integration. Switching duty cycles are skewed when operating in buck-boost mode to ensure a smooth transition from buck mode to buck-boost mode to boost mode (i.e., to prevent unnecessary transitions between modes). Some implementations of the DC-DC converter switch at a higher frequency when operating in boost mode (e.g., higher than when operating in buck mode) to reduce input and output current ripple.

Figure 1:
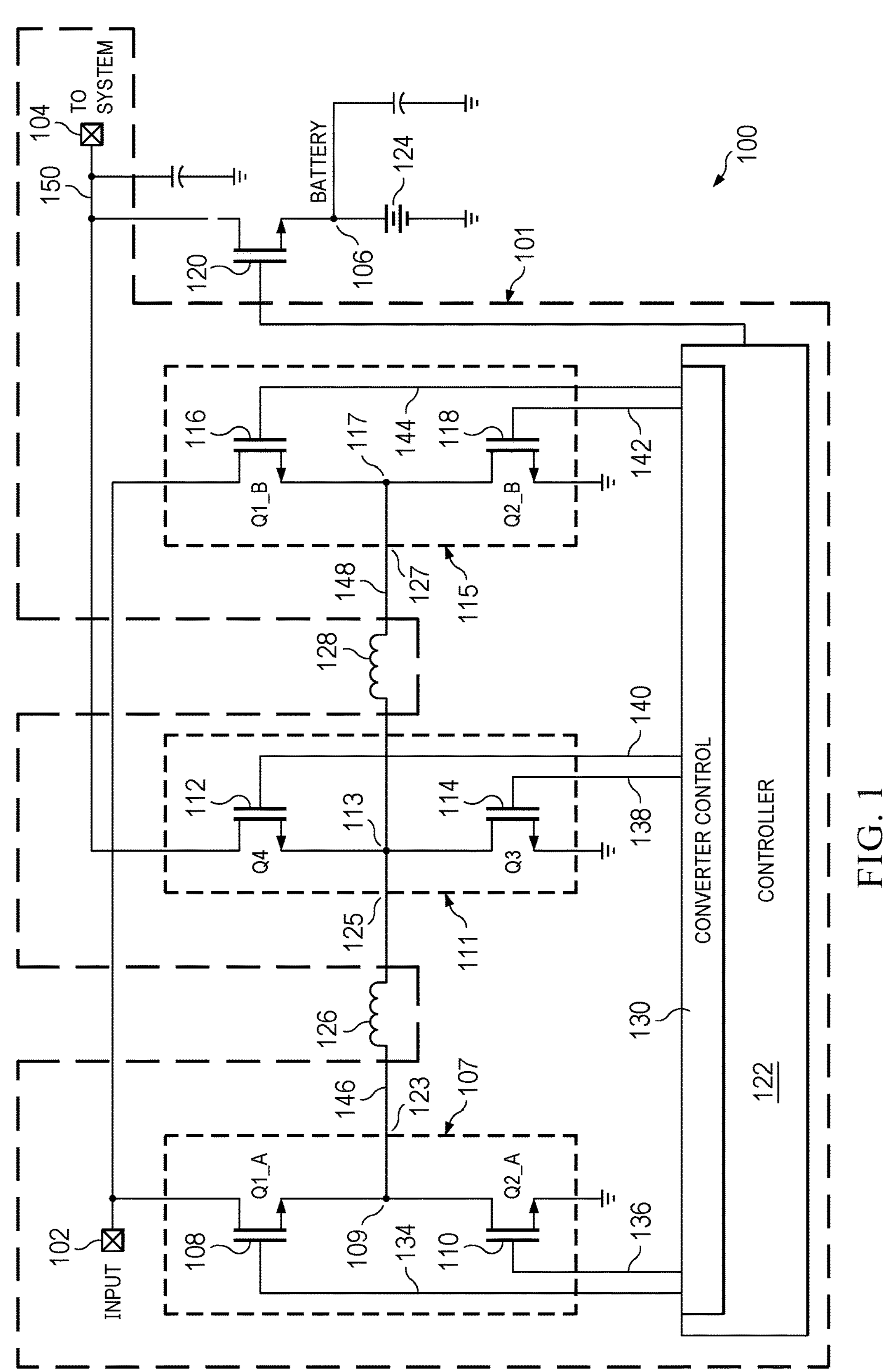
FIG. 1 is a block diagram of an example multi-phase buck-boost converter applied in a battery charger circuit.

FIG. 1 is a block diagram of an of an example multi-phase buck-boost converter 101 applied in a battery charger circuit 100. The battery charger circuit 100 includes a battery terminal 106 and a pass transistor 120. The multi-phase buck-boost converter 101 includes an input voltage terminal 102, an output voltage terminal 104, an inductor terminal 123, an inductor terminal 125, an inductor terminal 127, a half-bridge circuit 107, a half-bridge circuit 111, a half-bridge circuit 115, and a controller 122. The controller 122 includes a converter control circuit 130. A switching node 109 of the half-bridge circuit 107 is coupled to the inductor terminal 123 and a first terminal of an inductor 126. A switching node 113 of the half-bridge circuit 111 is coupled to the inductor terminal 125, a second terminal of an inductor 126, and a first terminal of an inductor 128. A switching node 117 of the half-bridge circuit 115 is coupled to the inductor terminal 127 and a second terminal of the inductor 128. The half-bridge circuit 107 includes a high-side transistor 108 and a low-side transistor 110. The half-bridge circuit 111 includes a high-side transistor 112 and a low-side transistor 114. The half-bridge circuit 115 includes a high-side transistor 116 and a low-side transistor 118. The high-side transistor 108, the low-side transistor 110, the high-side transistor 112, the low-side transistor 114, the high-side transistor 116, the low-side transistor 118, and the pass transistor 120 may N-channel field effect transistors (NFETs). The high-side transistor 108, the high-side transistor 112, the high-side transistor 116, and the pass transistor 120 may be p-channel FETS (PFETs) in some examples.

A drain of the high-side transistor 108 is coupled to the input voltage terminal 102. A gate of the high-side transistor 108 is coupled to the converter control circuit 130. A source of the high-side transistor 108 is coupled to the switching node 109. A drain of the low-side transistor 110 is coupled to the switching node 109. A gate of the low-side transistor 110 is coupled to the converter control circuit 130. A source of the low-side transistor 110 is coupled to a ground terminal. A drain of the high-side transistor 116 is coupled to the input voltage terminal 102. A gate of the high-side transistor 116 is coupled to the converter control circuit 130. A source of the high-side transistor 116 is coupled to the switching node 117. A drain of the low-side transistor 118 is coupled to the switching node 117. A gate of the low-side transistor 118 is coupled to the converter control circuit 130. A source of the low-side transistor 118 is coupled to the ground terminal. A drain of the high-side transistor 112 is coupled to the output voltage terminal 104. A gate of the high-side transistor 112 is coupled to the converter control circuit 130. A source of the high-side transistor 112 is coupled to the switching node 113. A drain of the low-side transistor 114 is coupled to the switching node 113. A gate of the low-side transistor 114 is coupled to the converter control circuit 130. A source of the low-side transistor 114 is coupled to the ground terminal.

The converter control circuit 130 controls switching in the half-bridge circuit 107, the half-bridge circuit 111, and the half-bridge circuit 115 to implement buck mode, buck-boost mode, and boost mode operation. When the voltage at the input voltage terminal 102 is substantially greater than the voltage at the output voltage terminal 104, the converter control circuit 130 alternately switches the half-bridge circuit 107 and the half-bridge circuit 115 180 degrees out of phase to implement buck mode operation. Within a half-bridge circuit, the high-side transistor and the low-side transistor are reciprocally switched. The minimum difference between the voltage at the input voltage terminal 102 and the voltage at the output voltage terminal 104 to enter buck mode is determined by the maximum duty cycle of the buck converter, and the resistive voltage drop of the field effect transistors ("FETs") and inductors, which changes based on inductor current. An example maximum duty cycle may be about 97%. In buck mode, the converter control circuit 130 turns off the low-side transistor 114, and turns on the high-side transistor 112 to connect the inductor 126 and the inductor 128 to the output voltage terminal 104. In buck mode, the converter control circuit 130 switches the half-bridge circuit 107 and the half-bridge circuit 115 at a frequency ($f_0$) selected to reduce inductor ripple and improve conversion efficiency.

When the voltage at the input voltage terminal 102 is substantially less than the voltage at the output voltage terminal 104, the converter control circuit 130 switches the half-bridge circuit 111 to implement boost mode operation. The minimum difference between the voltage at the output voltage terminal 104 and the voltage at the input voltage terminal 102 to enter boost mode is determined by the minimum duty cycle of the boost converter. The converter control circuit 130 turns on the high-side transistor 108 and the high-side transistor 116, and turns off the low-side transistor 110 and the low-side transistor 118 during boost mode operation. The converter control circuit 130 may switch the half-bridge circuit 111 at a frequency that is higher than $f_0$ when operating in boost mode to reduce inductor current ripple. For example, the converter control circuit 130 may switch the half-bridge circuit 111 at $2f_0$ in some implementations. In some examples, the converter control circuit 130 may switch the half-bridge circuit 111 at a lower frequency to improve efficiency.

When the difference between the voltage at the input voltage terminal 102 and the voltage at the output voltage terminal 104 is less than the minimum voltage to enter buck mode and the difference between the voltage at the output voltage terminal 104 and the voltage at the input voltage terminal 102 is less than the minimum voltage to enter boost mode, the converter control circuit 130 switches the half-bridge circuit 107, the half-bridge circuit 111, and the half-bridge circuit 115 in sequence to implement buck-boost mode operation. The converter control circuit 130 alternates switching of the half-bridge circuit 107 and the half-bridge circuit 115 to equalize the currents in the inductor 126 and the inductor 128.

A battery 124 is coupled to the battery terminal 106. The pass transistor 120 controls the flow of current to the battery 124 for charging, and from the battery 124 for powering a load coupled to the output voltage terminal 104. A drain of the pass transistor 120 is coupled to the output voltage terminal 104. A gate of the pass transistor 120 is coupled to the controller 122. A source of the pass transistor 120 is coupled to the battery terminal 106. The controller 122 controls the pass transistor 120 to enable charging of the battery 124.

Figure 2:
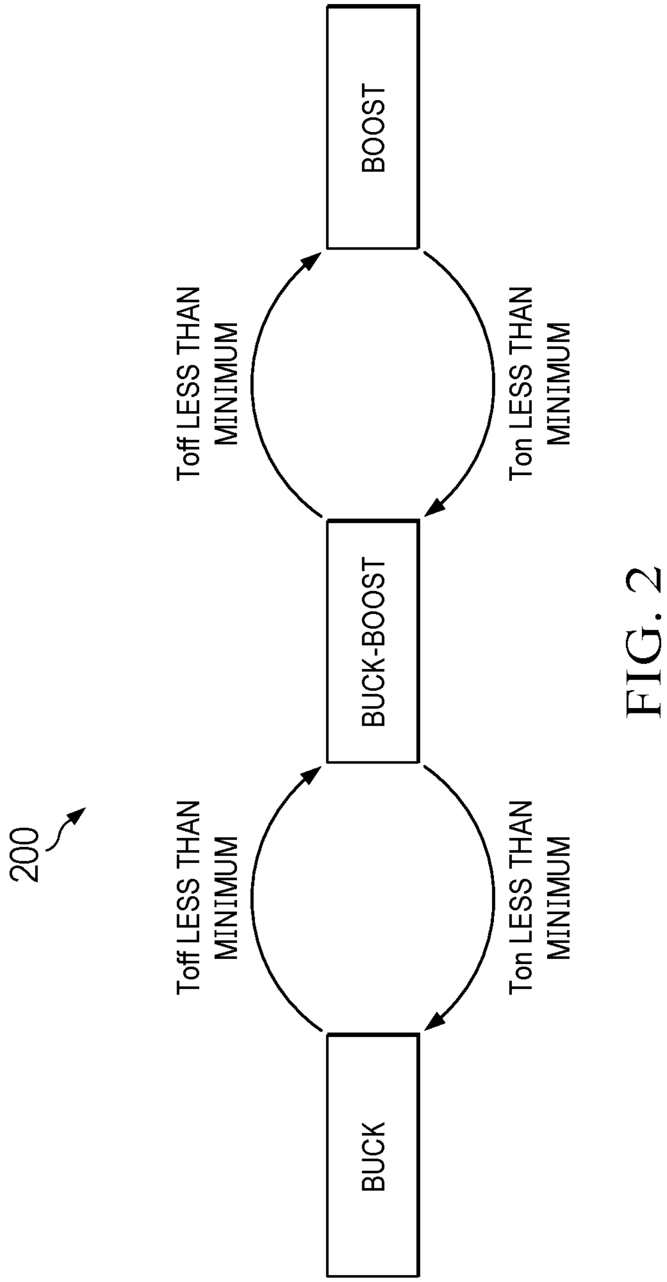
FIG. 2 is an example state diagram showing transitions between operational modes in the multi-phase buck-boost converter of FIG. 1.

FIG. 2 is an example state diagram showing transitions between operational modes in the multi-phase buck-boost DC-DC converter 101. When operating in the buck mode, the converter control circuit 130 monitors the off-time of the half-bridge circuit 107 and the half-bridge circuit 115 (the time that the low-side transistor 110 or the low-side transistor 118 are turned on). If the off-time of the half-bridge circuit 107 and the half-bridge circuit 115 is less than a predetermined buck-boost transition time, then the converter control circuit 130 transitions the multi-phase buck-boost DC-DC converter 101 from buck mode to buck-boost mode. Otherwise, the converter control circuit 130 continues to operate the multi-phase buck-boost DC-DC converter 101 in buck mode. The predetermined buck-boost transition time is set to be greater than the minimum possible pulse of the converter. For an implementation of the multi-phase buck-boost DC-DC converter 101 using silicon FETs, this value may be in the range of low tens of nanoseconds, although it could be higher for extremely high-power converters and less for high-frequency highly-integrated converters.

When operating in the buck-boost mode, the converter control circuit 130 monitors the off-time of the half-bridge circuit 107 and the half-bridge circuit 115 (the time that the low-side transistor 110 or the low-side transistor 118 are turned on). If the off-time of the half-bridge circuit 107 and the half-bridge circuit 115 is less than a predetermined boost transition time, then the converter control circuit 130 transitions the multi-phase buck-boost DC-DC converter 101 from buck-boost mode to boost mode. The predetermined boost transition time may be similar to the predetermined buck-boost transition time described above. In buck-boost mode, the converter control circuit 130 monitors the on-time of the half-bridge circuit (the time that the low-side transistor 114 is turned on). If the on-time of the half-bridge circuit 111 is less than a predetermined buck transition time, then the converter control circuit 130 transitions the multi-phase buck-boost DC-DC converter 101 from buck-boost mode to buck mode. The predetermined buck transition time may be similar to the predetermined buck-boost transition time described above. While the off-time of the half-bridge circuit 107 and the half-bridge circuit 115 is not less than a predetermined boost transition time, and the on-time of the half-bridge circuit 111 is not greater than a predetermined buck transition time, the converter control circuit 130 continues to operate the multi-phase buck-boost DC-DC converter 101 in buck-boost mode.

When operating in the boost mode, the converter control circuit 130 also monitors the on-time of the half-bridge circuit 111 (the time that the low-side transistor 114 is turned on). If the on-time of the half-bridge circuit 111 is less than a predetermined time (similar to the predetermined buck-boost transition time described above), then the converter control circuit 130 transitions the multi-phase buck-boost DC-DC converter 101 from boost mode to buck-boost mode. Otherwise, the converter control circuit 130 continues to operate the multi-phase buck-boost DC-DC converter 101 in boost mode.

Figure 3:
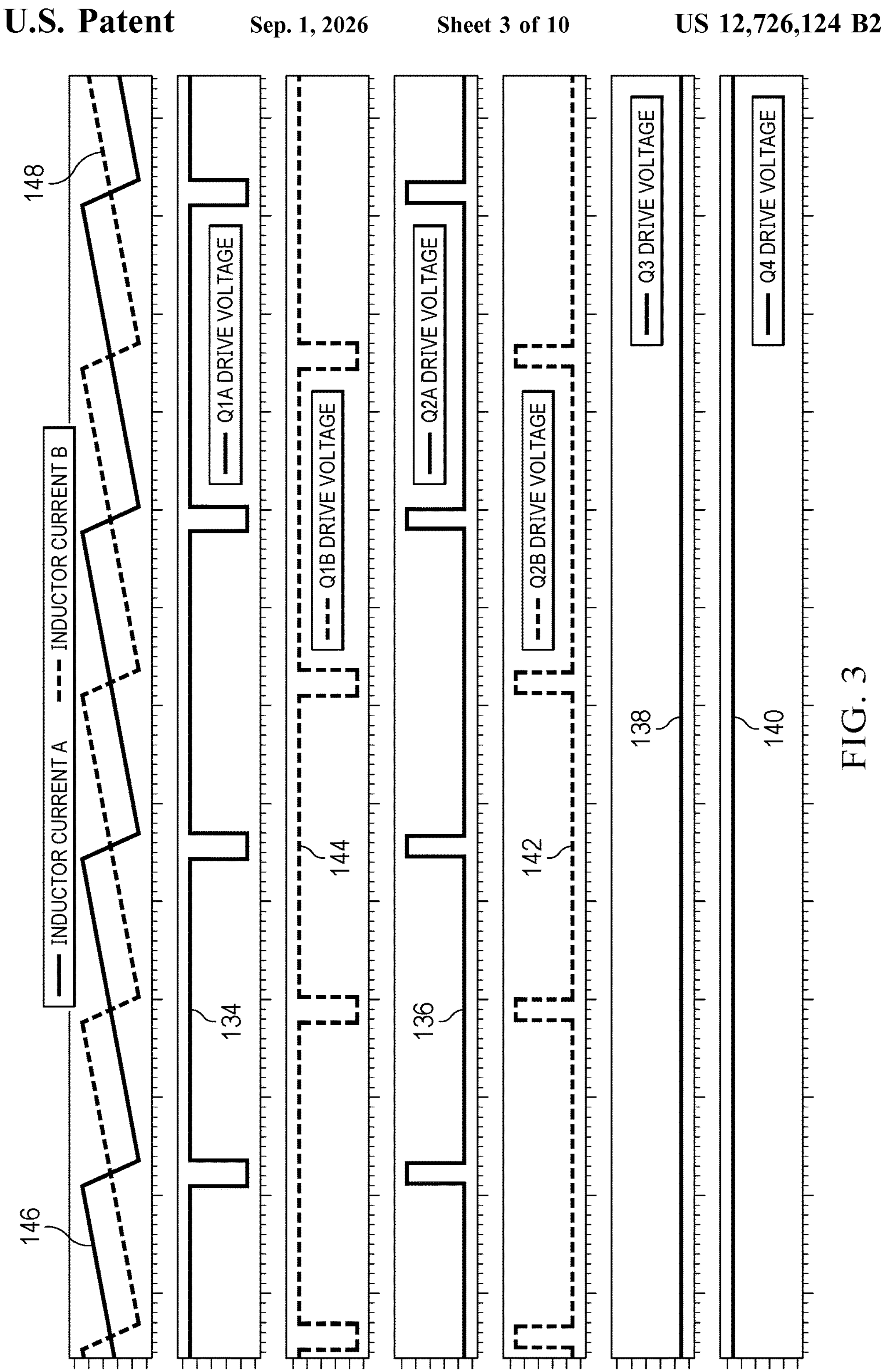
FIG. 3 is an example timing diagram of buck mode operation in the multi-phase buck-boost converter of FIG. 1.

FIG. 3 is an example timing diagram of buck mode operation in the multi-phase buck-boost DC-DC converter 101. The switching cycles of the half-bridge circuit 107 and the half-bridge circuit 115 are offset by about 180° relative to each other as shown by inductor current 146 and inductor current 148. The converter control circuit 130 generates complementary high-side drive signal 134 and low-side drive signal 136 to control the high-side transistor 108 and the low-side transistor 110, respectively. The high-side drive signal 134 turns on the high-side transistor 108, and the low-side drive signal 136 turns off the low-side transistor 110, to charge the inductor 126. The low-side drive signal 136 turns on the low-side transistor 110, and the high-side drive signal 134 turns off the high-side transistor 108, to discharge the inductor 126. The converter control circuit 130 generates complementary high-side drive signal 144 and low-side drive signal 142 to control the high-side transistor 116 and the low-side transistor 118, respectively. The high-side drive signal 144 turns on the high-side transistor 116, and the low-side drive signal 142 turns off the low-side transistor 118, to charge the inductor 128. The low-side drive signal 142 turns on the low-side transistor 118, and the high-side drive signal 144 turns off the high-side transistor 116, to discharge the inductor 128. The converter control circuit 130 generates a high-side drive signal 140 and a low-side drive signal 138 to control the high-side transistor 112 and the low-side transistor 114. In buck mode, the high-side drive signal 140 turns on the high-side transistor 112, and the low-side drive signal 138 turns off the low-side transistor 114.

Figure 4:
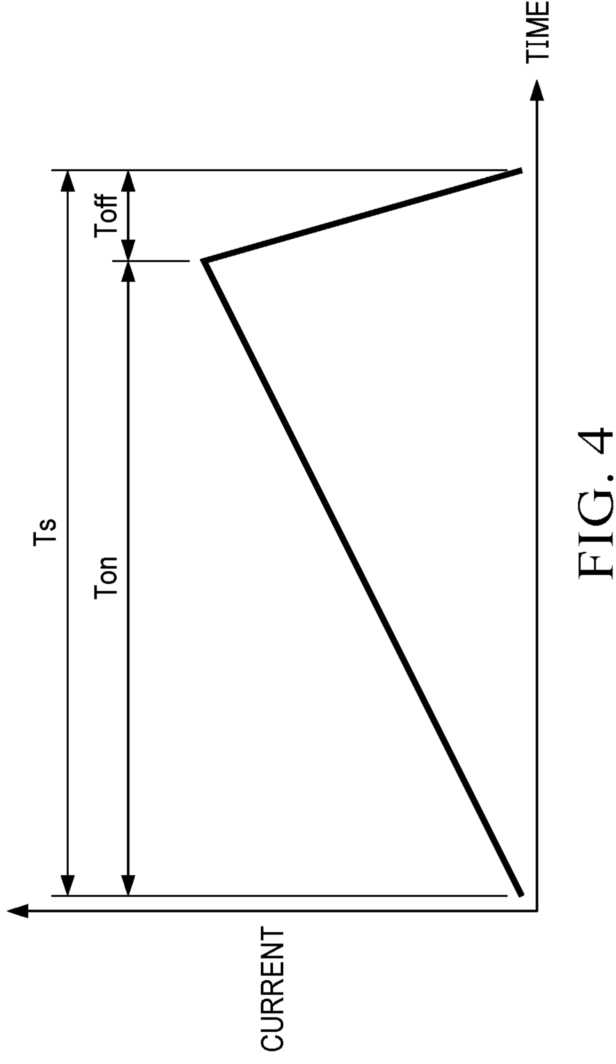
FIG. 4 is a graph of an example buck-mode switching cycle in the multi-phase buck-boost converter of FIG. 1.

FIG. 4 is a graph of an example buck-mode switching cycle. The duration of the switching cycle is denoted Ts. Ton signifies the time that high-side transistor 108 is on and the low-side transistor 110 is off, or that the high-side transistor 116 is on and the low-side transistor 118 is off. Toff signifies the time that low-side transistor 110 is on and the high-side transistor 108 is off, or that the low-side transistor 118 is on and the high-side transistor 116 is off. In buck mode, the transfer function of the multi-phase buck-boost DC-DC converter 101 may be expressed as:

$$\frac{V_{OUT}}{V_{IN}} = \frac{T_{ON}}{T_S}$$

where:

$V_{OUT}$ is voltage at the output voltage terminal 104;

$V_{IN}$ is voltage at the input voltage terminal 102; and $T_S$ and $T_{ON}$ are as illustrated in FIG. 4.

Figure 5:
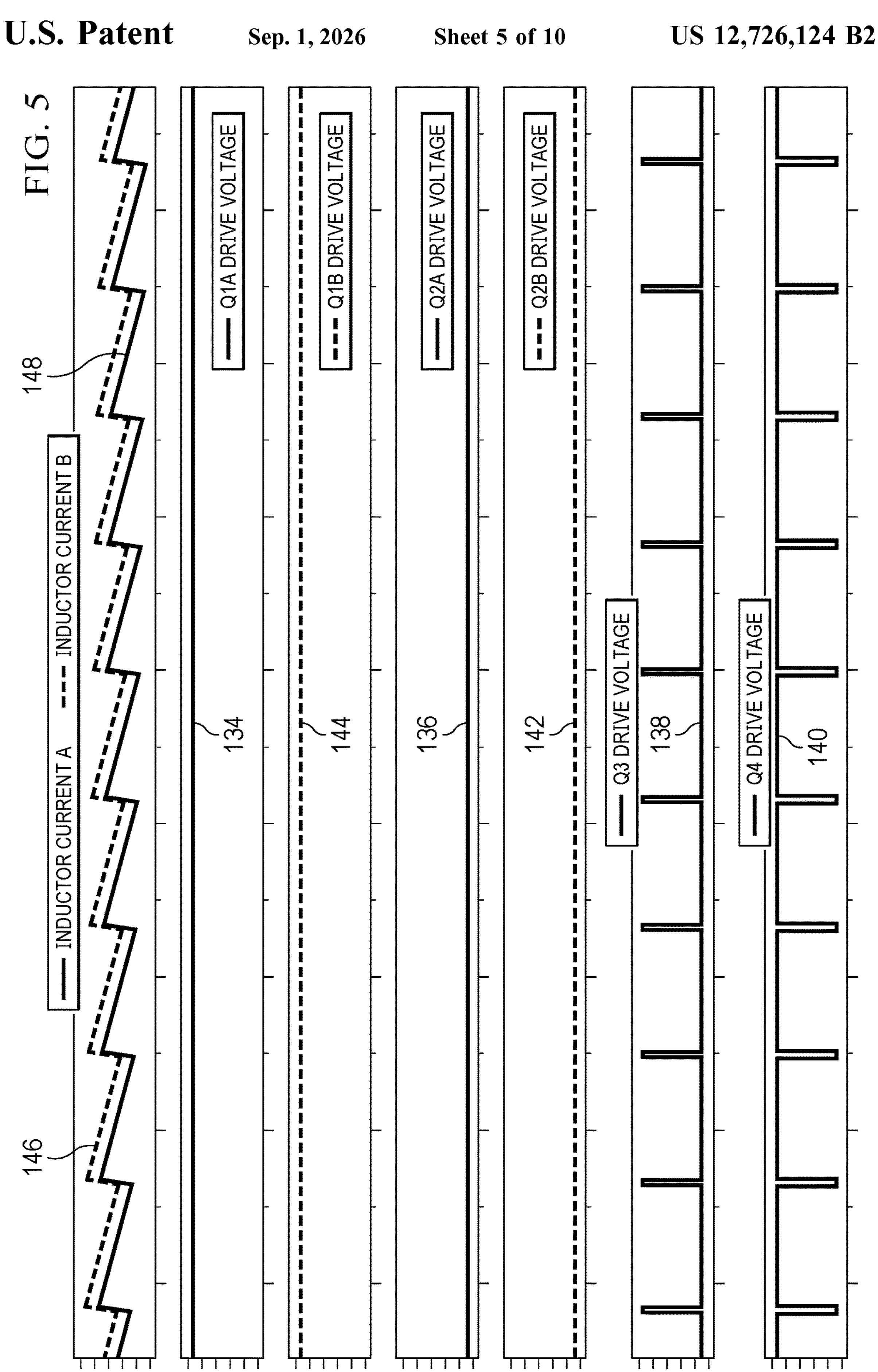
FIG. 5 is an example timing diagram of boost mode operation in the multi-phase buck-boost converter of FIG. 1.

FIG. 5 is an example timing diagram of boost mode operation in the multi-phase buck-boost DC-DC converter 101. In the boost mode, the high-side drive signal 134 turns on the high-side transistor 108, the high-side drive signal 144 turns on the high-side transistor 116, the low-side drive signal 136 turns off the low-side transistor 110, and the low-side drive signal 142 turns off the low-side transistor 118. The converter control circuit 130 switches the half-bridge circuit 111 to step up the voltage at the output voltage terminal 104. The low-side drive signal 138 turns on the low-side transistor 114, and the high-side drive signal 140 turns off the high-side transistor 112, to charge the inductor 126 and the inductor 128. The high-side drive signal 140 turns on the high-side transistor 112, and the low-side drive signal 138 turns off the low-side transistor 114, to discharge the inductor 126 and the inductor 128. The switching frequency of the low-side drive signal 138 and the high-side drive signal 140 may be higher (e.g., twice) than the switching frequency of the high-side drive signal 134, the low-side drive signal 136, the low-side drive signal 142, or the high-side drive signal 144 in buck mode to compensate for the reduction in inductance due the parallel inductors 126 and 128.

Figure 6:
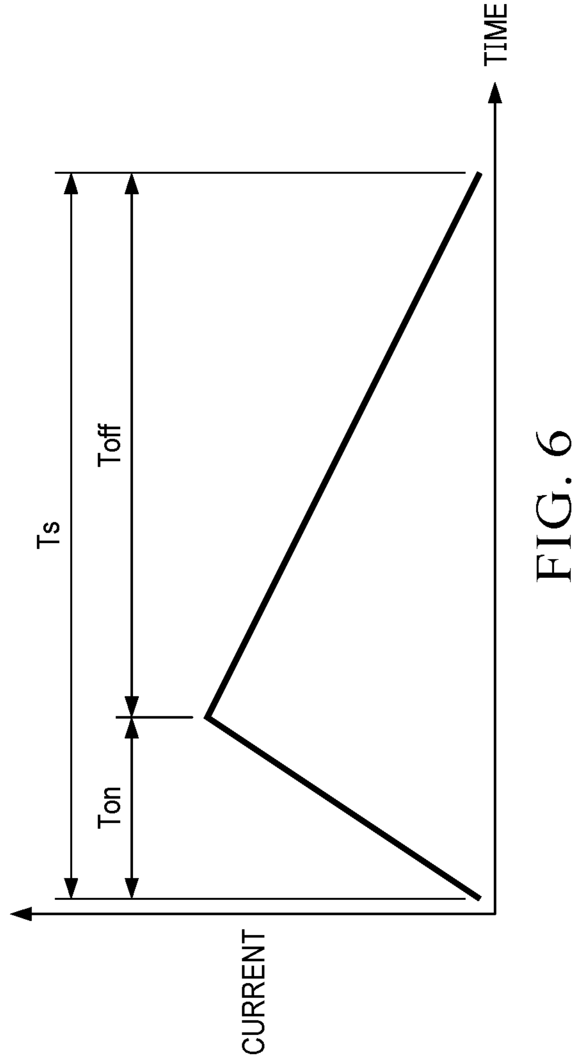
FIG. 6 is a graph of an example boost-mode switching cycle in the multi-phase buck-boost converter of FIG. 1.

FIG. 6 is a graph of an example boost-mode switching cycle. The duration of the switching cycle is denoted Ts. Ton signifies the time that low-side transistor 114 is on and the high-side transistor 112 is off. Toff signifies the time that high-side transistor 112 is on and the low-side transistor 114 is off.

Figure 7:
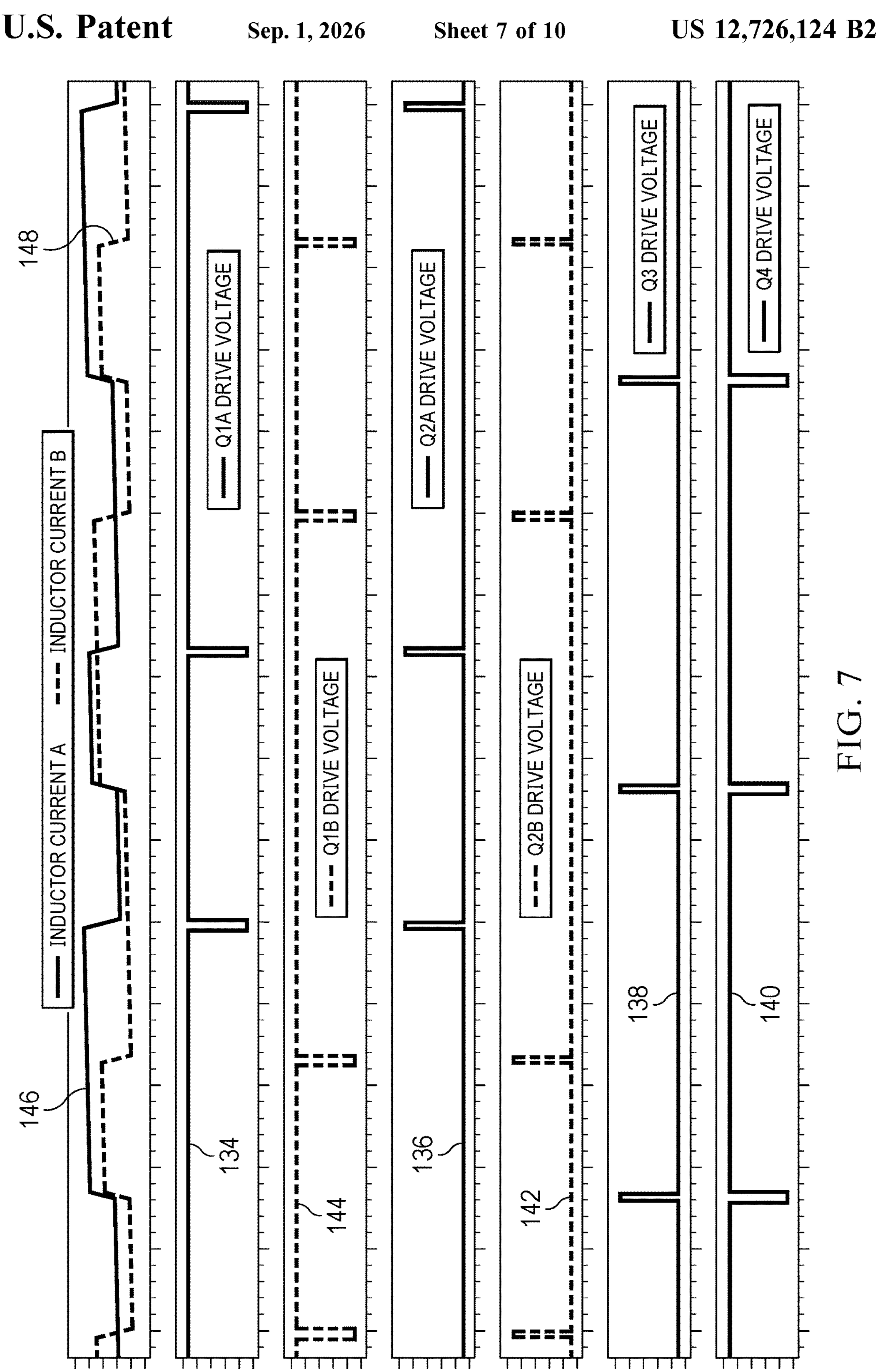
FIG. 7 is an example timing diagram of buck-boost mode operation in the multi-phase buck-boost converter of FIG. 1.

FIG. 7 is an example timing diagram of buck-boost mode operation in the multi-phase buck-boost DC-DC converter 101. In buck-boost mode, the converter control circuit 130 sequences switching of the half-bridge circuit 107, the half-bridge circuit 115, and the half-bridge circuit 111. The buck-boost switching cycle begins with execution of boost integration cycle, in which the low-side drive signal 138 turns on the low-side transistor 114, the high-side drive signal 140 turns off the high-side transistor 112, the high-side drive signal 134 turns on the high-side transistor 108, the low-side drive signal 136 turns off the low-side transistor 110, the high-side drive signal 144 turns on the high-side transistor 116, and the low-side drive signal 142 turns off the low-side transistor 118. The boost integration cycle charges the inductors 126 and 128. A first time interval after the boost cycle, a first buck de-integration cycle is executed in the half-bridge circuit 107 or the half-bridge circuit 115. For example, in the first buck de-integration cycle, the high-side transistor 108 is turned off, the low-side transistor 110 is turned on, the high-side transistor 116 is turned on, and the low-side transistor 118 is turned off. A second time interval after the first buck de-integration cycle, a second buck de-integration cycle is executed in the one of the half-bridge circuit 107 and the half-bridge circuit 115 that did not execute the first de-integration cycle. For example, in the second buck de-integration cycle, the low-side transistor 118 is turned on, the high-side transistor 116 is turned off, the high-side transistor 108 is turned on, and the low-side transistor 110 is turned off. Thus, the inductors 126 and 128 are simultaneously charged in the boost cycle, and sequentially discharged in the buck de-integration cycles. In two adjacent buck-boost cycles, the de-integration cycles are alternated. In a first buck-boost cycle, the half-bridge circuit 107 executes a buck de-integration cycle before the half-bridge circuit 115 executes a de-integration cycle. In a second buck-boost cycle (immediately following the first buck-boost cycle), the half-bridge circuit 115 executes a buck de-integration cycle before the half-bridge circuit 107 executes a de-integration cycle. The alternation averages the current between the half-bridge circuit 107 and half-bridge circuit 115. The de-integration timing is set by a modulator, of the converter control circuit 130, that adjusts the timing to regulate the output current and voltage. If the current or voltage is too great, the de-integration time is increased. This may be accomplished by a pulse width modulator (PWM) ramp, a control signal, and a comparator.

Figure 8:
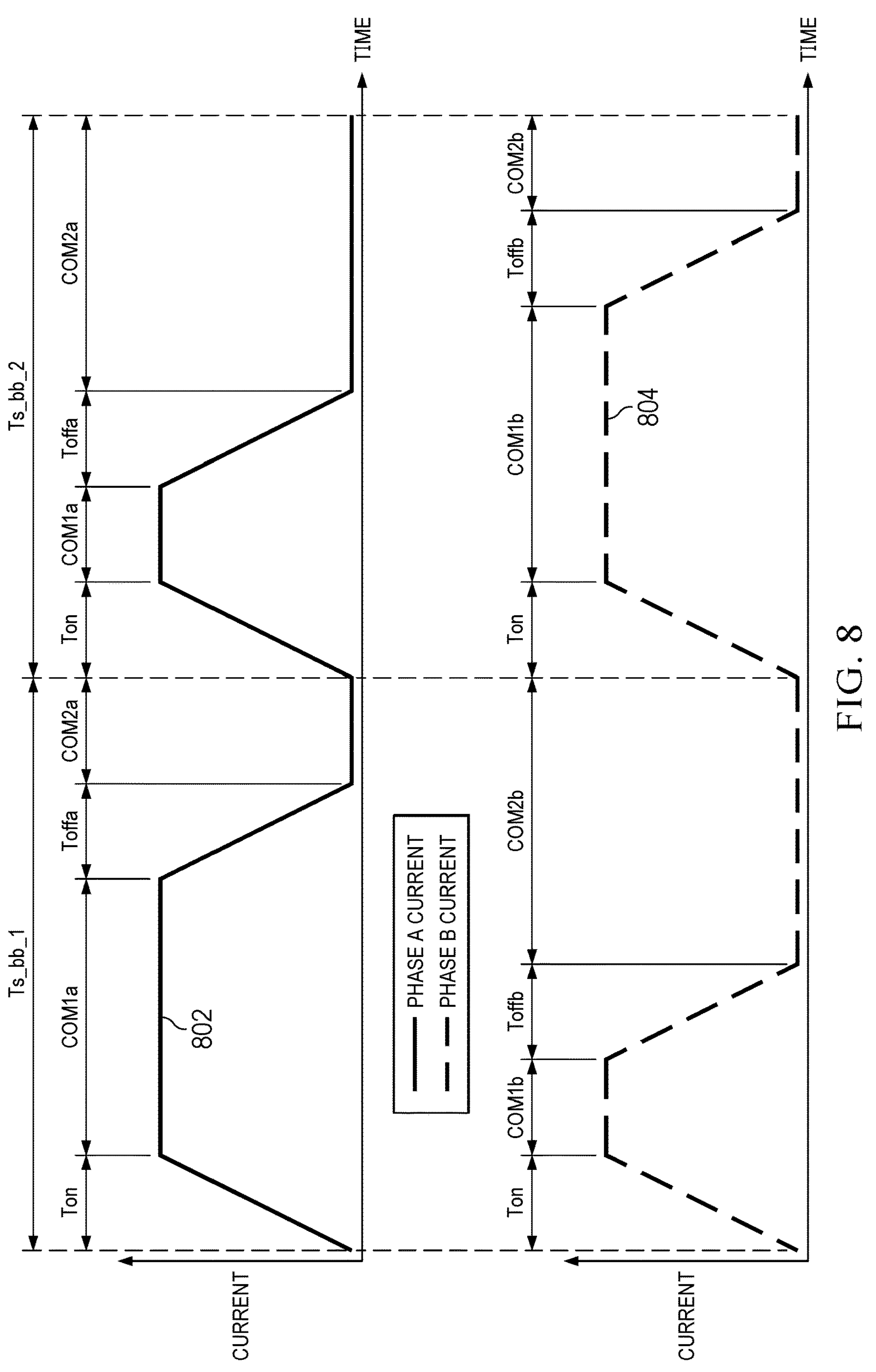
FIG. 8 is a graph of example boost-mode switching cycles in the multi-phase buck-boost converter of FIG. 1.

FIG. 8 is a graph of example buck-boost-mode switching cycles in the multi-phase buck-boost DC-DC converter 101. A first buck-boost switching cycle is denoted Ts_bb_1, and a second (subsequent) buck-boost switching cycle is denoted Ts_bb_2. Ton signifies the time (the portion of the buck-boost-mode switching cycle) that the boost integration cycle is active. Toff (Toffa and Toffb) signifies the time that buck de-integration is active.

The buck-boost transfer function may be expressed as:

$$\frac{V_{OUT}}{V_{IN}} = \frac{1 - \frac{T_{OFF}}{T_S}}{1 - \frac{T_{ON}}{T_S}}$$

At the operational mode transition points, a given control signal should produce the same output voltage in buck, boost, and buck-boost modes. The converter control circuit 130 accomplishes this by increasing the slope of the PWM ramp generated in the converter control circuit 130 in the buck-boost mode. Increasing the ramp slope increases both Ton and Toff-time in the buck-boost mode. The Ton and Toff signals are generated by two ramps, combined with the control signal and comparators. The Ton and Toff signals are high when the ramps are above the control signal. When the slope of the PWM ramp is increased, it increases the width of both the Ton and Toff signals. The cycle time in buck-boost mode may be different from the cycle time in buck mode because the buck-boost cycle includes a boost cycle. The ramp slope in buck-boost mode is adjusted to account for this difference.

In FIG. 8, the current 802 represents the current flowing in the inductor 126, and the current 804 represents the current flowing in the inductor 128 in sequential buck-boost cycles. In the Ton interval, at the start of Ts_bb_1 and Ts_bb_2, a boost integration cycle is executed to charge the inductors 126 and 128. In the interval COM1*a*, the high-side transistor 108 is turned on and the low-side transistor 110 is turned off. Similarly, in the interval COM2*a*, the high-side transistor 116 is turned on and the low-side transistor 118 is turned off. COM1*a* and COM2*a* correspond to buck integration and boost de-integration. In the interval Toffa, the high-side transistor 108 is turned on and the low-side transistor 110 is turned off to execute a buck de-integration cycle with respect to the inductor 126. In the interval COM1*b*, after the buck de-integration cycle, the high-side transistor 108 is turned on and the low-side transistor 110 is turned off. Similarly, in the interval Toffb, the low-side transistor 118 is turned on and the high-side transistor 116 is turned off to execute a buck de-integration cycle with respect to the inductor 128. By executing Toff at different times (applying differing time offsets with respect to one another), the converter control circuit 130 preserves dual-phase reduction of ripple current in buck-boost mode. In the interval COM2*b*, after the buck de-integration cycle, the high-side transistor 116 is turned on and the low-side transistor 118 is turned off. COM1*b* and COM2*b* correspond to buck integration and boost de-integration.

In Ts_bb_1, COM1*a* is longer than COM2*a*. In Ts_bb_2, COM 2*a* is longer than COM1*a*. For example, in Ts_bb_2, COM1*a* may be the same length as COM2*a* in Ts_bb_1, and COM2*a* may be the same length as COM1*a* in Ts_bb_1. By alternating the length of the COM1 and COM2 in successive switching cycles, the converter control circuit 130 ensures equal average current in the inductor 126 and inductor 128. The duty cycles of each phase may be adjusted to compensate for mismatch in propagation delays or inductor parameters and ensure even current.

Figure 9:
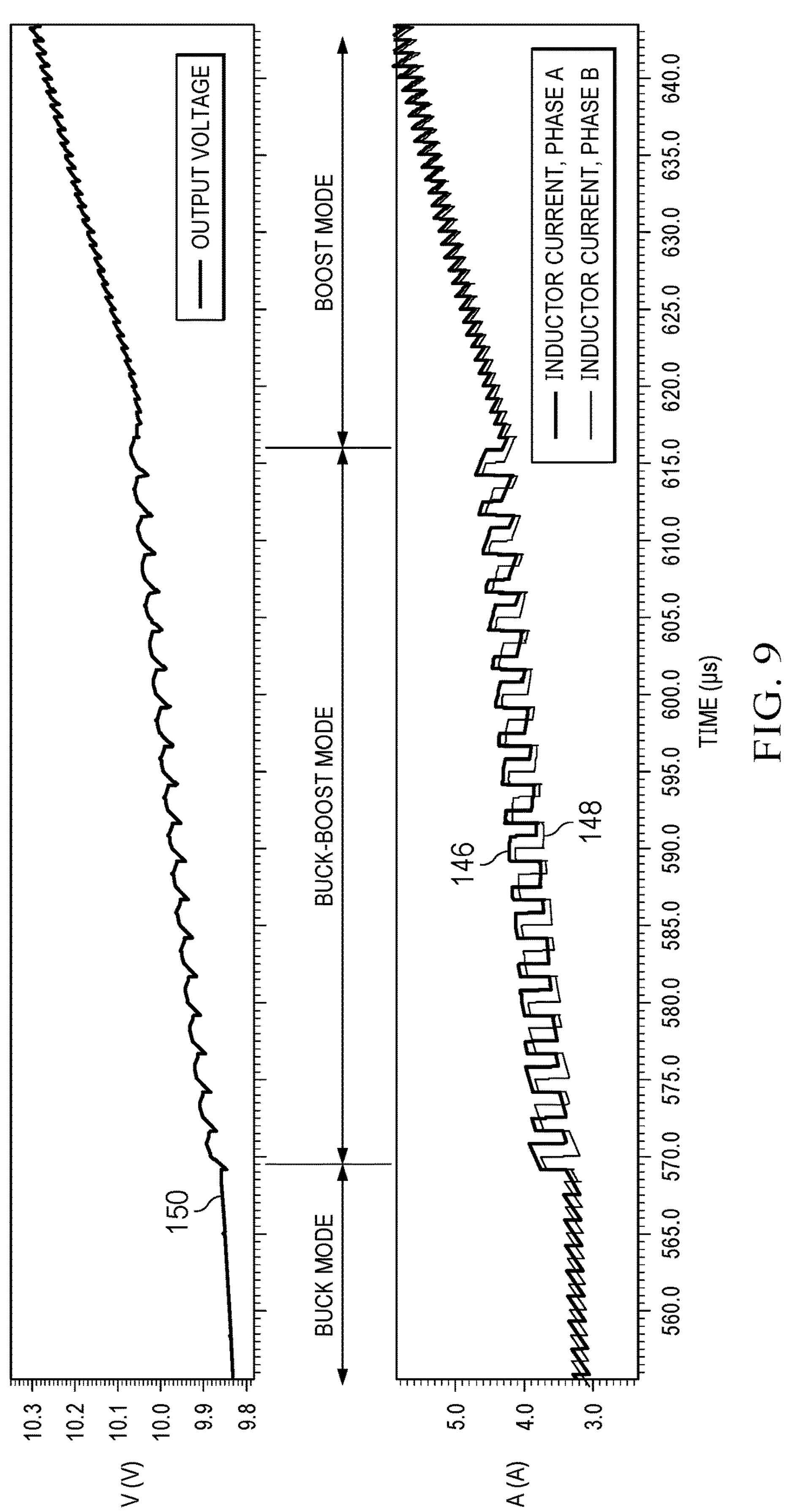
FIG. 9 is an example graph of output voltage and inductor current as the buck-boost converter of FIG. 1 transitions from buck mode to buck-boost mode to boost mode.

FIG. 9 is an example graph of output voltage and inductor current as the multi-phase buck-boost DC-DC converter 101 transitions from buck mode to buck-boost mode to boost mode. Inductor current 146, inductor current 148, and output voltage 150 are shown in FIG. 9. FIG. 9 shows that the multi-phase buck-boost DC-DC converter 101 provides a seamless transition between buck, buck-boost, and boost modes as the output voltage 150 rises, with no imbalance between inductor currents 146 and 148 as the current waveform changes.

Figure 10:
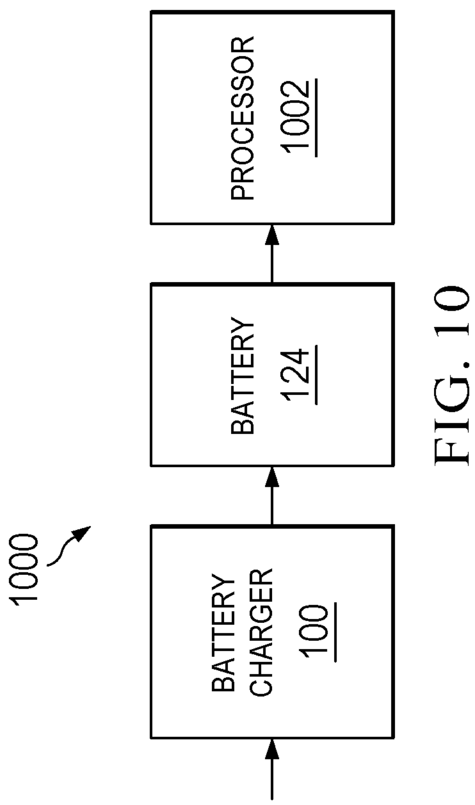
FIG. 10 is a block diagram of an example computer system that includes the battery charger circuit of FIG. 1.

FIG. 10 is a block diagram of an example computer system 1000 that includes the battery charger circuit 100. The computer system 1000 includes the battery 124 and a processor 1002 coupled to the battery charger circuit 100. The processor 1002 may be a general-purpose microprocessor, a graphics processor, or network processor, or other instruction execution device. Implementations of the computer system 1000 may include a variety of additional components coupled to the processor 1002 and the battery charger circuit 100 (e.g., memory, timing circuitry, communication circuitry, etc.). The battery charger circuit 100 generates a voltage for charging the battery 124 and for powering the processor 1002. The battery charger circuit 100 operates with a wide range on input voltages and provides seamless transitions between buck, buck-boost, and boost modes as described herein.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), insulated gate bipolar transistors (IGBTs), and/or junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References herein to a FET being "on" means that the conduction channel of the FET is present and drain current may flow through the FET. References herein to a FET being "off" means that the conduction channel is not present and drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. An apparatus, comprising:

a first half-bridge circuit coupled to a first inductor terminal and to a power input;

a second half-bridge circuit coupled to a second inductor terminal and to the power input;

a third half-bridge circuit coupled to a third inductor terminal and to a power output; and a control circuit coupled to the first half-bridge circuit, the second half-bridge circuit, and the third half-bridge circuit, the control circuit configurable to:

in a first interval, cause the first half-bridge circuit and the second half-bridge circuit to connect, respectively, the first and second inductor terminals to the power input, and cause the third half-bridge circuit to connect the third inductor terminal to a ground terminal;

in a second interval, cause the first half-bridge circuit to connect the first inductor terminal to the ground terminal and the third half-bridge circuit to connect the third inductor terminal to the power output.

2. The apparatus of claim 1, wherein the first and second intervals are part of a first switching cycle; and the control circuit is configurable to:

in a first interval of a second switching cycle, cause the first half-bridge circuit and the second half-bridge circuit to connect, respectively, the first and second inductor terminals to the power input, and cause the third half-bridge circuit to connect the third inductor terminal to a ground terminal;

in a second interval of the second switching cycle, cause the second half-bridge circuit to connect the second inductor terminal to the ground terminal and the third half-bridge circuit to connect to third inductor terminal to the power output.

3. The apparatus of claim 2, wherein the control circuit is configurable to operate the first, second, and third half-bridges in a buck mode, a boost mode, and a buck-boost mode, and wherein the first, second, and third half-bridges operate in the buck-boost mode in the first and second switching cycles.

4. The apparatus of claim 1, wherein the control circuit is configurable to operate the first, second, and third half-bridges in a buck mode, a boost mode, and a buck-boost mode, and the control circuit is configurable to:

transition the first half-bridge circuit, the second half-bridge circuit, and the third half-bridge circuit from operation in a buck mode to operation in a buck-boost mode based on an off-time of the first half-bridge circuit being less than a first predefined time; and transition the first half-bridge circuit, the second half-bridge circuit, and the third half-bridge circuit from operation in the buck-boost mode to operation in a boost mode based on an off-time of the first half-bridge circuit being less than a second predefined time.

5. The apparatus of claim 4, wherein:

the control circuit is configured to transition the first half-bridge circuit, the second half-bridge circuit, and the third half-bridge circuit from operation in the buck-boost mode to operation in the buck mode based on an on-time of the first half-bridge circuit being less than a third predefined time.

6. The apparatus of claim 4, wherein:

the control circuit is configurable to transition the first half-bridge circuit, the second half-bridge circuit, and the third half-bridge circuit from operation in the boost mode to operation in the buck-boost mode based on an on-time of the first half-bridge circuit being less than a third predefined time.

7. The apparatus of claim 4 wherein:

the first half-bridge circuit includes a first high-side transistor and a first low-side transistor;

the second half-bridge circuit includes a second high-side transistor and a second low-side transistor;

the third half-bridge circuit includes a third high-side transistor and a third low-side transistor; and the control circuit is configurable to, in the buck mode:

turn on the third high-side transistor through a switching cycle;

turn off the third low-side transistor through the switching cycle;

reciprocally switch the first high-side transistor and the first low-side transistor;

reciprocally switch the second high-side transistor and the second low-side transistor; and offset switching in the second half-bridge circuit from switching of the first half-bridge circuit by 90 degrees.

8. The apparatus of claim 7, wherein the control circuit is configurable to, in the boost mode:

turn on the first high-side transistor and the second high-side transistor through the switching cycle;

turn off the first low-side transistor and the second low-side transistor through the switching cycle; and reciprocally switch the third high-side transistor and the third low-side transistor.

9. The apparatus of claim 8, wherein the control circuit is configurable to, in the boost mode, switch the third high-side transistor and the third low-side transistor at a higher frequency than the first high-side transistor and the first low-side transistor are switched in the buck mode.

10. The apparatus of claim 7, wherein the control circuit is configurable to, in the buck-boost mode:

in a first interval of the switching cycle:

turn on the first high-side transistor, the second high-side transistor, and the third low-side transistor; and turn off the first low-side transistor, the second low-side transistor, and the third high-side transistor;

in a second interval of the switching cycle:

turn on the first high-side transistor, the second low-side transistor, and the third high-side transistor; and turn off the second high-side transistor, the first low-side transistor, and the third low-side transistor; and in a third interval of the switching cycle:

turn on the second high-side transistor, the first low-side transistor, and the third high-side transistor; and turn off the first high-side transistor, the second low-side transistor, and the third low-side transistor.

11. A multi-phase buck-boost converter, comprising:

a first half-bridge circuit coupled between an input voltage terminal and a first inductor terminal;

a second half-bridge circuit coupled between the input voltage terminal and a second inductor terminal;

a third half-bridge circuit coupled between an output voltage terminal and a third inductor terminal;

a control circuit coupled to the first half-bridge circuit, the second half-bridge circuit, and the third half-bridge circuit, the control circuit configurable to:

operate the first half-bridge circuit, the second half-bridge circuit, and the third half-bridge circuit in a buck mode based on an on-time of the first half-bridge circuit being less than a first predefined time;

operate the first half-bridge circuit, the second half-bridge circuit, and the third half-bridge circuit as a buck-boost mode based on an off-time of the first half-bridge circuit being less than a second predefined time; and operate the first half-bridge circuit, the second half-bridge circuit, and the third half-bridge circuit as a boost mode based on an off-time of the first half-bridge circuit being less than a third predefined time.

12. The multi-phase buck-boost converter of claim 11, wherein the control circuit is configurable to transition the first half-bridge circuit, the second half-bridge circuit, and the third half-bridge circuit from the boost mode to the buck-boost mode based on an on-time of the first half-bridge circuit being less than a fourth predefined time.

13. The multi-phase buck-boost converter of claim 11, wherein:

the control circuit is configurable to, in the buck mode:

connect the third inductor terminal to the output voltage terminal via the third half-bridge circuit; and alternately switch the first half-bridge circuit and the second half-bridge circuit.

14. The multi-phase buck-boost converter of claim 13, wherein the control circuit is configurable to, in the boost mode:

connect the input voltage terminal to the first inductor terminal via the first half-bridge circuit;

connect the input voltage terminal to the second inductor terminal via the second half-bridge circuit; and switch the third half-bridge circuit.

15. The multi-phase buck-boost converter of claim 14, wherein a switching frequency of the third half-bridge circuit in the boost mode is greater than a switching frequency of the first half-bridge circuit in the buck mode.

16. The multi-phase buck-boost converter of claim 11, wherein the control circuit is configurable to, in a buck-boost mode:

operate the first half-bridge circuit, the second half-bridge circuit, and the third half-bridge circuit to execute a boost integration cycle in a first portion of a switching cycle;

operate the first half-bridge circuit, the second half-bridge circuit, and the third half-bridge circuit to execute a first buck de-integration cycle in a second portion of the switching cycle; and operate the first half-bridge circuit, the second half-bridge circuit, and the third half-bridge circuit to execute a second buck de-integration cycle in a third portion of the switching cycle.

17. The multi-phase buck-boost converter of claim 16, wherein:

the second buck de-integration cycle is executed after the first buck de-integration cycle; and in a first switching cycle, a first time offsets the first buck de-integration cycle from the second buck de-integration cycle; and in a second switching cycle, a second time, different from the first time, offsets the first buck de-integration cycle from the second buck de-integration cycle.

18. A system, comprising:

a battery charger circuit having a power input coupled to a battery and a power output, and including a power converter, the power converter including:

a first half-bridge circuit coupled to a first inductor terminal and to the power input;

a second half-bridge circuit coupled to a second inductor terminal and to the power input;

a third half-bridge circuit coupled to a third inductor terminal and to the power output;

a switch coupled between the power output and a battery terminal; and a control circuit coupled to the first half-bridge circuit, the second half-bridge circuit, the third half-bridge circuit, and the switch, the control circuit configurable to:

in a first interval, cause the first half-bridge circuit and the second half-bridge circuit to connect, respectively, the first and second inductor terminals to the power input, and cause the third half-bridge circuit to connect the third inductor terminal to a ground terminal;

in a second interval, cause the first half-bridge circuit to connect the first inductor terminal to the ground terminal and the third half-bridge circuit to connect the third inductor terminal to the power output;

a first inductor coupled between the first and third inductor terminals;

a second inductor coupled between the second and third inductor terminals;

a load coupled to the power output; and a battery coupled to the battery terminal.

19. The system of claim 18, wherein the first and second intervals are part of a first switching cycle; and the control circuit is configurable to:

in a first interval of a second switching cycle, cause the first half-bridge circuit and the second half-bridge circuit to connect, respectively, the first and second inductor terminals to the power input, and cause the third half-bridge circuit to connect the third inductor terminal to a ground terminal;

in a second interval of the second switching cycle, cause the second half-bridge circuit to connect the second inductor terminal to the ground terminal and the third half-bridge circuit to connect to third inductor terminal to the power output.

20. The system of claim 19, wherein the control circuit is configurable to operate the first, second, and third half-bridges in a buck mode, a boost mode, and a buck-boost mode, and wherein the first, second, and third half-bridges operate in the buck-boost mode in the first and second switching cycles.

21. The system of claim 18, wherein the control circuit is configurable to operate the first, second, and third half-bridges in a buck mode, a boost mode, and a buck-boost mode, and the control circuit is configurable to:

transition the first half-bridge circuit, the second half-bridge circuit, and the third half-bridge circuit from operation in the buck mode to operation in the buck-boost mode based on an off-time of the first half-bridge circuit being less than a first predefined time; and transition the first half-bridge circuit, the second half-bridge circuit, and the third half-bridge circuit from operation in the buck-boost mode to operation in the boost mode based on an off-time of the first half-bridge circuit being less than a second predefined time.

22. The system of claim 21, wherein:

the control circuit is configured to transition the first half-bridge circuit, the second half-bridge circuit, and the third half-bridge circuit from operation in the buck-boost mode to operation in the buck mode based on an on-time of the first half-bridge circuit being less than a second predefined time.

23. The system of claim 21, wherein:

the control circuit is configured to transition the first half-bridge circuit, the second half-bridge circuit, and the third half-bridge circuit from operation in the boost mode to operation in the buck-boost mode based on an on-time of the first half-bridge circuit being less than a second predefined time.

24. The system of claim 21, wherein a switching frequency of the third half-bridge circuit in the boost mode is greater than a switching frequency of the first half-bridge circuit in the buck mode.

25. The system of claim 21, wherein the control circuit is configured to, in the buck-boost mode:

operate the first half-bridge circuit, the second half-bridge circuit, and the third half-bridge circuit to execute a boost integration cycle in a first portion of a switching cycle; and operate the first half-bridge circuit, the second half-bridge circuit, and the third half-bridge circuit to execute a buck de-integration cycle in a second portion of a switching cycle.

26. The system of claim 18, wherein the load includes a processor.

* * * * *